(12) United States Patent
Kawada et al.

(10) Patent No.: US 9,156,000 B2
(45) Date of Patent: Oct. 13, 2015

(54) EXHAUST GAS PURIFIER

(71) Applicant: HINO MOTORS, LTD., Tokyo (JP)

(72) Inventors: Yoshihiro Kawada, Tokyo (JP); Asahiko Shimizu, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 6 days.

(21) Appl. No.: 14/346,041

(22) PCT Filed: Sep. 18, 2012

(86) PCT No.: PCT/JP2012/073775
§ 371 (c)(1),
(2) Date: Mar. 20, 2014

(87) PCT Pub. No.: WO2013/042644
PCT Pub. Date: Mar. 28, 2013

(65) Prior Publication Data
US 2014/0286827 A1    Sep. 25, 2014

(30) Foreign Application Priority Data

Sep. 21, 2011   (JP) ................................. 2011-206122

(51) Int. Cl.
*B01D 50/00*    (2006.01)
*B01D 53/94*    (2006.01)
(Continued)

(52) U.S. Cl.
CPC ............ *B01D 53/9495* (2013.01); *B01D 53/22* (2013.01); *B01D 53/9409* (2013.01);
(Continued)

(58) Field of Classification Search
CPC .......... F01N 2610/02; F01N 2560/026; F01N 2900/1404; F01N 3/035; B01D 2255/20746; B01D 2251/2067

USPC ........................ 422/170, 186.03, 186.04, 105
See application file for complete search history.

(56) References Cited

U.S. PATENT DOCUMENTS 7,090,811 B2 *    8/2006    Cho et al. .................... 423/239.2
2009/0064664 A1 *    3/2009    Hirata et al. .................... 60/286
(Continued)

FOREIGN PATENT DOCUMENTS

CN    1830526 A    9/2006
CN    101915146 A    12/2010
(Continued)

OTHER PUBLICATIONS

International Search Report, mailed Nov. 13, 2012, for PCT/JP2012/073775, 4 pages.
(Continued)

*Primary Examiner* — Tom P Duong
(74) *Attorney, Agent, or Firm* — Seed IP Law Group PLLC (57) ABSTRACT

An oxidation catalyst, an ozone injection nozzle, a urea-based fluid injection nozzle, and a selective reduction catalyst are arranged in an exhaust pipe of an engine in this order towards its outlet. An exhaust gas purifier includes an air flow sensor that detects an air intake amount of the engine, a NOx sensor that detects a NOx concentration in the exhaust pipe, and first and second temperature sensors that detect inlet temperatures of the catalysts. An ozone generation device to which the ozone injection nozzle is connected includes a compressor, a dryer that dries compressed air, a flow rate sensor that detects a flow rate of this air, an ozone generator that converts this air into ozone, and an ozone concentration sensor that detects a concentration of the ozone. A controller controls the compressor and the ozone generator based on respective detection outputs of the respective sensors.

5 Claims, 8 Drawing Sheets

(51) Int. Cl.
- *B01D 53/22* (2006.01)
- *C01B 13/10* (2006.01)
- *F01N 3/20* (2006.01)
- *F01N 3/035* (2006.01)
- *B01D 63/02* (2006.01)
- *B01D 71/64* (2006.01)

(52) U.S. Cl.
CPC ............... *C01B13/10* (2013.01); *F01N 3/035* (2013.01); *F01N 3/208* (2013.01); *B01D 63/02* (2013.01); *B01D 71/64* (2013.01); *B01D 2251/104* (2013.01); *B01D 2251/2067* (2013.01); *B01D 2255/20738* (2013.01); *B01D 2255/20746* (2013.01); *B01D 2255/20761* (2013.01); *B01D 2255/20792* (2013.01); *B01D 2255/50* (2013.01); *B01D 2256/12* (2013.01); *B01D 2257/102* (2013.01); *B01D 2257/80* (2013.01); *C01B 2201/62* (2013.01); *C01B 2201/76* (2013.01); *F01N 2240/38* (2013.01); *F01N 2560/026* (2013.01); *F01N 2560/06* (2013.01); *F01N 2610/02* (2013.01); *F01N 2610/06* (2013.01); *F01N 2900/1402* (2013.01); *F01N 2900/1404* (2013.01); *Y02T 10/24* (2013.01)

(56) References Cited

U.S. PATENT DOCUMENTS

| | | |
|---|---|---|
| 2010/0005787 A1 | 1/2010 | Hosoya et al. |
| 2010/0221164 A1* | 9/2010 | Lee et al. .................. 423/239.2 |

FOREIGN PATENT DOCUMENTS

| | | |
|---|---|---|
| EP | 1 359 120 A1 | 11/2003 |
| JP | 06-024710 A | 2/1994 |
| JP | 06-234505 A | 8/1994 |
| JP | 07-277708 A | 10/1995 |
| JP | 2007-016635 A | 1/2007 |
| JP | 2009-264285 A | 11/2009 |
| JP | 2010-168981 A | 8/2010 |
| JP | 2010-209854 A | 9/2010 |
| JP | 2012-026331 A | 2/2012 |

OTHER PUBLICATIONS

International Preliminary Report on Patentability dated Sep. 9, 2013, for corresponding International Application No. PCT/JP2012/073775, 6 pages.

Written Opinion of the International Searching Authority dated Nov. 2, 2012, for corresponding international Application No. PCT/JP2012/073775, 8 pages.

Extended European Search Report, mailed Jul. 29, 2015, for PCT/JP2012073775, 6 pages.

* cited by examiner

EXHAUST GAS PURIFIER

TECHNICAL FIELD

The present invention relates to an apparatus for decreasing nitrogen oxides (NOx) contained in an exhaust gas of an engine, to thereby purify the exhaust gas.

BACKGROUND ART

Conventionally, there is disclosed an exhaust gas aftertreatment system in which exhaust gas discharged from an internal combustion engine flows through an exhaust pipe; a muffler for reducing exhaust noise that is created when the exhaust gas is released to the atmosphere is connected to the exhaust pipe; a purifier for purifying the exhaust gas is provided in the exhaust pipe; ozone is generated by an ozone generation reactor; the ozone generation reactor and the exhaust pipe are connected to each other on an upstream side of the purifier in a direction in which the exhaust gas flows by an ozone supply pipe; and the ozone generated by the ozone generation reactor is supplied to the inside of the exhaust pipe via the ozone supply pipe (see, for example, Patent Literature 1). In this exhaust gas aftertreatment system, an amount of ozone is detected by an ozone sensor, and this ozone sensor is disposed in at least one of the inside of the ozone supply pipe and immediately before the muffler. Also, the ozone generation reactor is provided with a generation section having a pair of electrodes in the inside thereof, a power source section for applying a high voltage between the electrodes, and an air pump for supplying air into the inside of the generation section. In addition, the ozone supply pipe is provided with an on-off valve which switches communication and interruption between the ozone supply pipe and the exhaust pipe. Furthermore, the power source section, the air pump, and the on-off valve are electrically connected to an ECU (Engine Control Unit), and the exhaust gas aftertreatment system is configured so that their operations are controlled based on an output from ECU.

In the thus configured exhaust gas aftertreatment system, in the case where the ozone sensor is disposed in the inside of the ozone supply pipe, since the ozone supply pipe is not a passage through which the exhaust gas flows, it does not become a high temperature state as in the inside of the exhaust pipe. In consequence, it is possible to use, as the ozone sensor, a semiconductor ozone sensor which is low in heat resistance but is capable of detecting a minute amount of ozone, and the generation amount of ozone by the ozone generation reactor can be accurately detected. Meanwhile, in the case where the ozone sensor is disposed immediately before the muffler, in general, the exhaust gas which has passed through the purifier is cooled during a period in which it flows inside the exhaust pipe, and before the exhaust gas reaches the muffler, it becomes a temperature state such that it is possible to use a semiconductor ozone sensor. In consequence, it is possible to use a semiconductor ozone sensor as the ozone sensor, and the amount of ozone remaining in an unreacted state is accurately detected. Therefore, it has become possible to accurately detect the amount of ozone.

Meanwhile, there is disclosed an ozone generation device in which a high-voltage electrode is provided on one of surfaces of a dielectric; an ground electrode is arranged in parallel via a gap part on the other surface of the dielectric; these electrodes are housed in an ozone generation vessel; and a voltage is applied between the high-voltage electrode and the ground electrode to generate ozone in a raw material gas which has been allowed to flow into the gap part (see, for example, Patent Literature 2). This ozone generation device is configured so that a nitrogen enrichment apparatus concentrates nitrogen in compressed air and removes it, the residual gas after nitrogen has been removed by this nitrogen enrichment apparatus and the above-described compressed air are mixed, and this mixed gas is introduced as the raw material gas into the ozone generation vessel. Also, an oxygen concentration of the raw material gas to be introduced into the ozone generation vessel is detected by an oxygen concentration meter, and a concentration of ozone generated in the ozone generation vessel is detected by an ozone concentration meter. Furthermore, a control means controls the oxygen concentration of the raw material gas to be introduced into the ozone generation vessel, a gas flow rate, and an amount of input power based on respective detection outputs of the oxygen concentration meter and the ozone concentration meter. It is noted that a membrane separation type apparatus is used as the nitrogen enrichment apparatus.

In the thus configured ozone generation device, the nitrogen-concentrated gas (nitrogen-rich gas) is released and removed by the nitrogen enrichment apparatus, and therefore, a large amount of oxygen is contained in the residual gas. Then, the control means is controlled based on the detection output of each concentration meter. Therefore, when the ozone concentration is given as an instruction value, not only the raw material gas is controlled to have optimum oxygen concentration and gas flow rate, but also the amount of input power to the ozone generation device is controlled to be an optimum amount of input power. As a result, the above-described ozone generation device is able to avoid waste of oxygen, is low in costs, and enables the operation efficiency to increase. Also, since a part of the compressed air is enriched by the nitrogen enrichment apparatus, oxygen having a desired high concentration is obtained without increase of the amount of compressed air. As a result, a loss in a compressor that compresses air can be decreased.

CITATION LIST

Patent Literature

Patent Literature 1: JP 2012-26331 A (claim 1, paragraphs [0009] and [0016], and FIG. 1)
Patent Literature 2: JP Hei.07-277708 A (claim 2, paragraphs [0011] to [0013] and [0022], and FIGS. 1 and 2)

SUMMARY OF THE INVENTION

Technical Problem

In the exhaust gas aftertreatment system disclosed in the above-described conventional Patent Literature 1, since the air pump and the ozone generator are connected directly with each other, the flow rate of air can be computed based on a rotation speed of the air pump or the like even without detection of a flow rate of air immediately before the air flows into the ozone generator. However, in the exhaust gas aftertreatment system disclosed in the above-described conventional Patent Literature 1, a relatively large amount of moisture is contained in air which is forcedly supplied into the air pump. Therefore, there was caused such an inconvenience that the ozone is not stably generated by the ozone generator, or a product is generated, so that the generation efficiency of ozone is low. For that reason, if a dehumidifier for removing the moisture in air is provided between the air pump and the ozone generator, the pressure of air from the air pump is increased by the dehumidifier. Therefore, the flow rate of air immediately before the air flows into the ozone generator cannot be accurately detected only based on the rotation speed of the air pump. Thus, there was a problem such that the supply amount of ozone relative to the NOx amount in the exhaust gas is excessively large or excessively small. Meanwhile, in the ozone generation device disclosed in the above-described conventional Patent Literature 2, since the gas (nitrogen-rich gas) in which nitrogen is concentrated by the membrane separation type nitrogen enrichment apparatus is released into the air as it is and removed, it was not contemplated to effectively utilize the gas (nitrogen-rich gas) in which nitrogen is concentrated. Also, the ozone generation device disclosed in the above-described conventional Patent Literature 2 had such a characteristic that generation of heat is easy to take place due to internal discharge.

A first object of the present invention is to provide an exhaust gas purifier capable of efficiently generating ozone by an ozone generator by removing moisture in air, which is compressed by a compressor, by means of a dehumidifier and capable of supplying just enough ozone in amount, which corresponds to an NOx amount in exhaust gas and a flow rate ratio of NO to $NO_2$, into an exhaust pipe by accurate detection of a flow rate of air immediately before the air flows into the ozone generator by means of a flow rate sensor. A second object of the present invention is to provide an exhaust gas purifier capable of efficiently decreasing NOx even when an exhaust gas temperature is low and capable of efficiently decreasing NOx over almost all exhaust gas temperature range. A third object of the present invention is to provide an exhaust gas purifier capable of efficiently cooling an ozone generator by means of either one or both of a nitrogen-rich gas separated by an air separator and drain water discharged from a dryer. A fourth object of the present invention is to provide an exhaust gas purifier capable of enhancing regeneration efficiency of a dryer.

Solution to Problem

Figure 1:
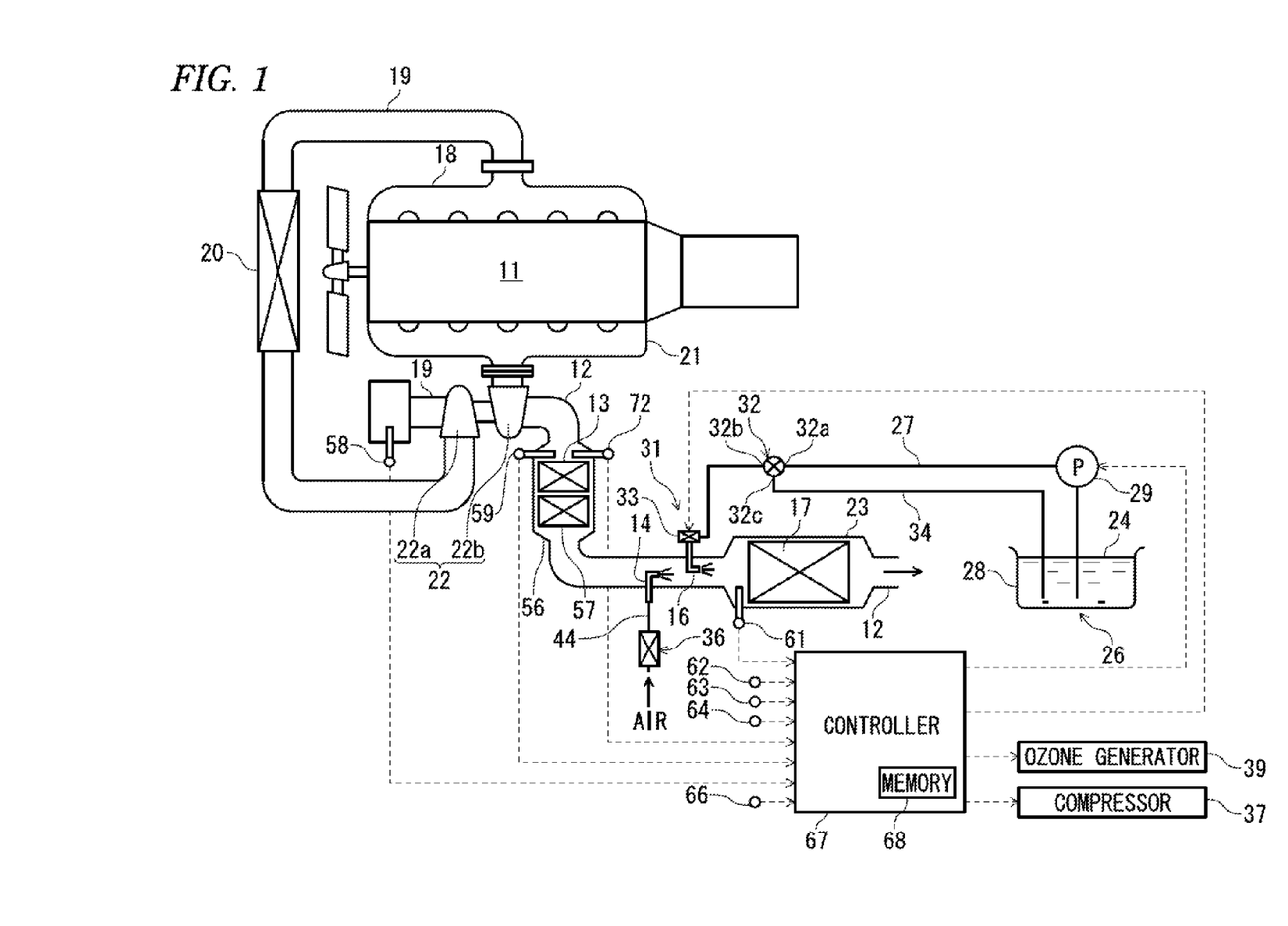
FIG. 1 is a configuration diagram of an exhaust gas purifier showing first embodiment of the present invention.
Figure 2:
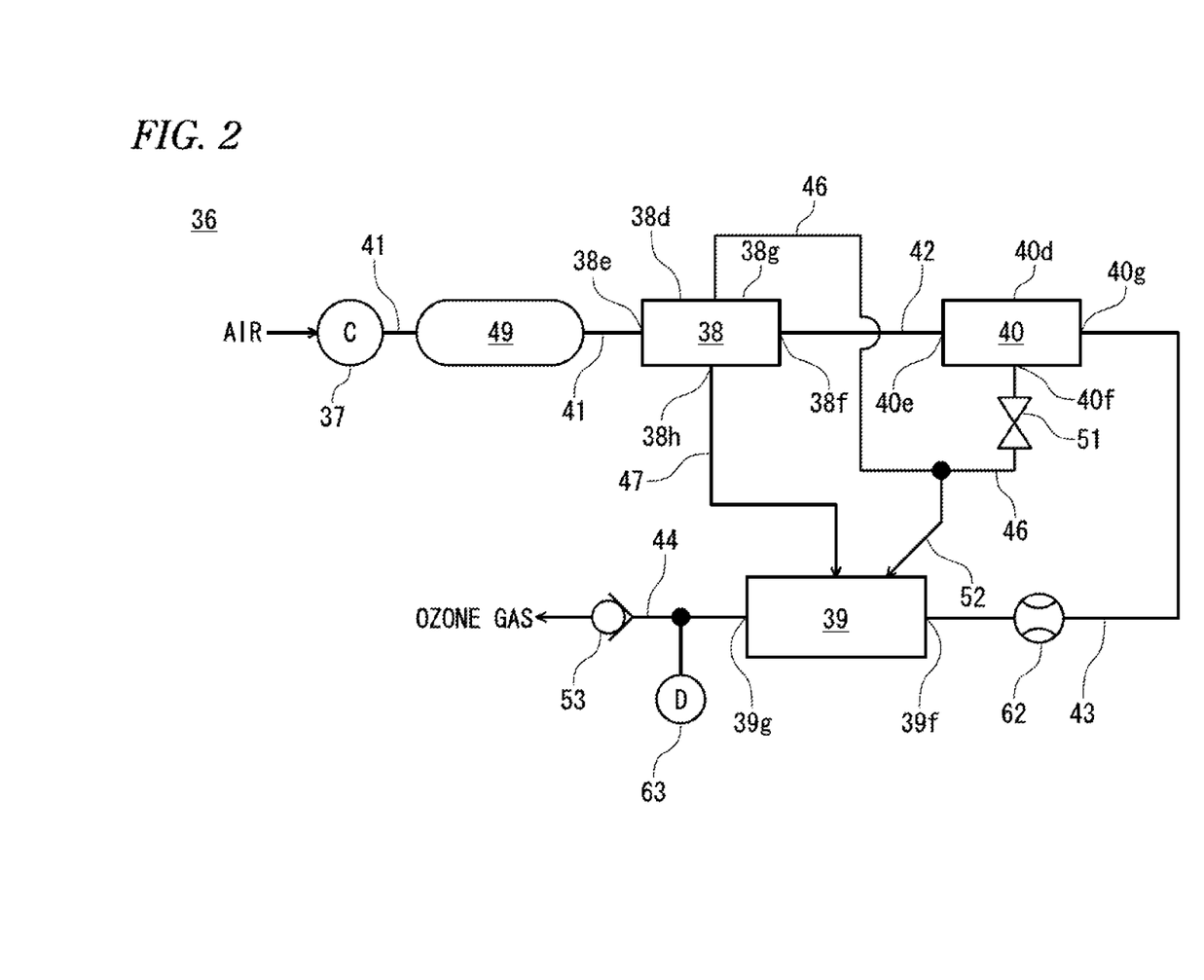
FIG. 2 is an air circuit configuration diagram of an ozone generation device provided in the exhaust gas purifier.

According to a first aspect of the present invention, as shown in FIGS. 1 and 2, an oxidation catalyst 13, an ozone injection nozzle 14, a urea-based fluid injection nozzle 16, and a selective reduction catalyst 17 are arranged in an exhaust pipe 12 of an engine 11 in this order towards an outlet of the exhaust pipe 12. An exhaust gas purifier includes an air flow sensor 58, a NOx sensor 59, a first temperature sensor 61, and a second temperature sensor 72. The air flow sensor 58 detects an air intake amount of the engine 11 The NOx sensor 59 is provided in the exhaust pipe 12 on an upstream side of the ozone injection nozzle 14 and detects a NOx concentration in the exhaust pipe 12 The first temperature sensor 61 detects an inlet temperature of the selective reduction catalyst 17 The second temperature sensor 72 detects an inlet temperature of the oxidation catalyst 13. The ozone injection nozzle 14 is connected to an ozone generation device 36. The ozone generation device 36 includes a compressor 37, a dryer 38, a flow rate sensor 62, an ozone generator 39, and an ozone concentration sensor 63. The compressor 37 compresses air. The dryer 38 dries the air compressed by the compressor 37. The flow rate sensor 62 detects a flow rate of the air dried by the dryer 38. The ozone generator 39 converts the air detected by the flow rate sensor 62 into ozone. The ozone concentration sensor 63 is provided between the ozone generator 39 and the ozone injection nozzle 14 and detects a concentration of the ozone converted by the ozone generator 39. A load of the engine 11 is detected by a load sensor 64. A controller 67 controls an amount of air compressed by the compressor 37 and an amount of ozone converted by the ozone generator 39 based on respective detection outputs of the air flow sensor 58, the NOx sensor 59, the first temperature sensor 61, the second temperature sensor 72, the flow rate sensor 62, the ozone concentration sensor 63, and the load sensor 64.

Figure 3:
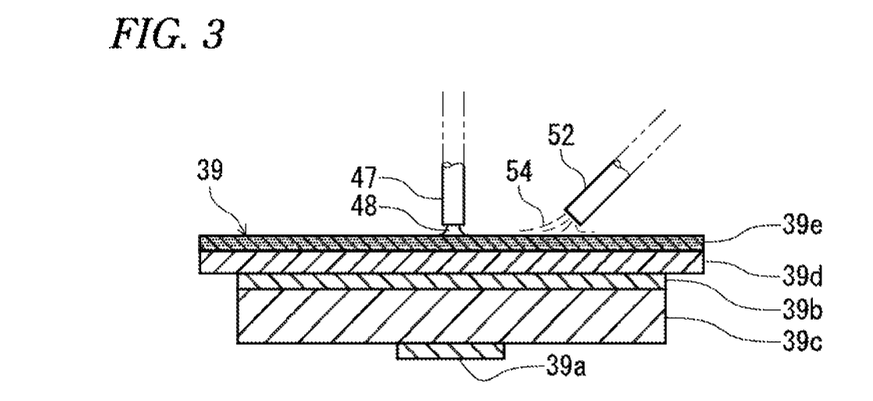
FIG. 3 is a main portion section configuration diagram showing a state where an ozone generator of the ozone generation device is cooled with nitrogen-rich gas and drain water.

According to a second aspect of the present invention, as further shown in FIGS. 2 and 3, the ozone generation device 36 further includes an air separator 40. The separator 40 is provided between the dryer 38 and the ozone generator 39 and separates the air dried by the dryer 38 into an oxygen-rich gas having a high oxygen concentration and a nitrogen-rich gas 54 having a high nitrogen concentration. A part of oxygen in the oxygen-rich gas separated by the air separator 40 is introduced into the ozone generator 39 and converted into ozone by the ozone generator 39. Moisture within the dryer 38 is removed by the nitrogen-rich gas 54 separated by the air separator 40, to regenerate the dryer 38. The ozone generator 39 is cooled by either or both of the nitrogen-rich gas 54 separated by the air separator 40 and drain water 48 that is the moisture discharged from the dryer 38.

According to a third aspect of the present invention, as further shown in FIG. 3, a porous moisture absorption member 39e that can absorb the drain water 48 is provided on a surface of the ozone generator 39.

Figure 5:
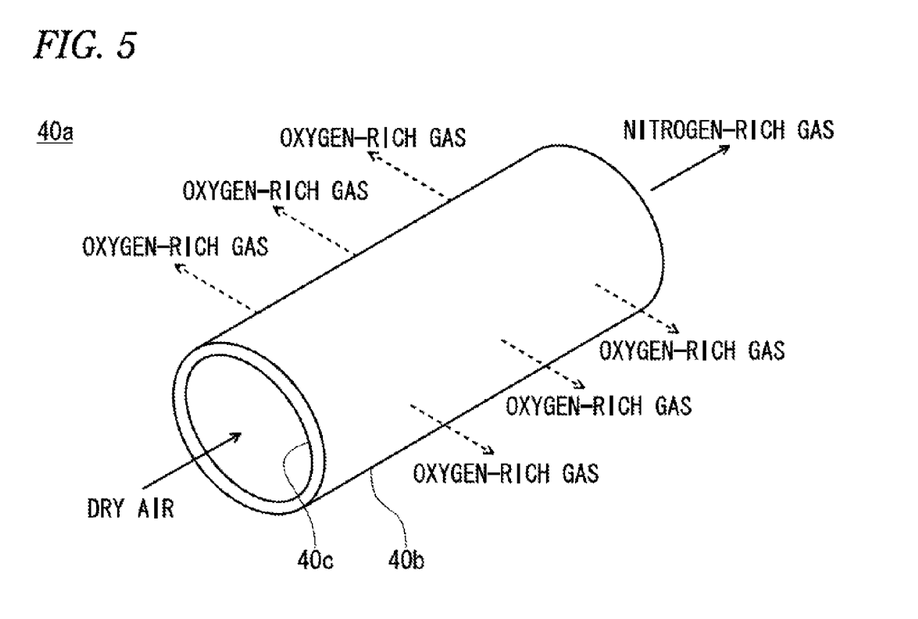
FIG. 5 is a main portion enlarged section view of a hollow fiber constituting an oxygen enrichment membrane of an air separator.

According to a fourth aspect of the present invention, as further shown in FIGS. 2, 3, and 5, the air separator 40 is configured by an oxygen enrichment membrane 40a. The oxygen-rich gas is generated by passage of the air, which is dried by the dryer 38, through the oxygen enrichment membrane 40a. The nitrogen-rich gas 54 is generated by going straight of the air, which is dried by the dryer 38, without passing through the oxygen enrichment membrane 40a.

According to a fifth aspect of the present invention, as further shown in FIGS. 2 and 3, the nitrogen-rich gas 54 separated by the air separator 40 goes through a purge pipe 46 and is supplied to the dryer 38. A gas flow rate regulation valve 51 is provided in the purge pipe 46. The gas flow rate regulation valve 51 regulates a flow rate of the nitrogen-rich gas 54, which passes through the purge pipe 46. One end of a branch pipe 52 is connected to the purge pipe 46 on a nitrogen-rich gas downstream side of the gas flow rate regulation valve 51. The other end of the branch pipe 52 is provided to face a surface of the ozone generator 39.

Advantageous Effects of Invention

In the exhaust gas purifier of the first aspect of the present invention, the controller controls the compressor and the ozone generator based on the respective detection outputs of the air flow sensor, the NOx sensor, the first temperature sensor, the second temperature sensor, the flow rate sensor, the ozone concentration sensor, and the load sensor. Air is compressed by this compressor, dry air obtained by removing the moisture from this air by a dehumidifier is supplied to the ozone generator, and ozone generated in this ozone generator is added to the exhaust pipe. As a result, as compared with the conventional exhaust gas aftertreatment system in which since a relatively large amount of moisture is contained in air which is forcedly supplied into an air pump, ozone is not stably generated by an ozone generator or a product is generated, so that the generation efficiency of ozone is low, according to the present invention, the moisture in the air is removed by the dehumidifier, and therefore, the ozone can be efficiently generated by the ozone generator.

Also, the controller computes an ozone requirement based on the respective detection outputs of the air flow sensor, the NOx sensor, the second temperature sensor, and the load sensor. On the other hand, the controller computes the ozone generation amount based on the respective detection outputs of the flow rate sensor and the ozone concentration sensor. Then, the controller controls the compressor and the ozone generator so as to coincide with the above-described ozone requirement. As a result, even if a surrounding environment (a surrounding temperature and/or a surrounding humidity) of the ozone generator changes, the ozone in proper quantity that corresponds to a NOx amount in the exhaust gas and a flow rate ratio of NO to $NO_2$ can be supplied into the exhaust pipe, namely just enough ozone in accurate amount following an operation state of the engine can be supplied into the exhaust pipe.

Furthermore, if the ozone is supplied from the ozone injection nozzle into the exhaust pipe, NO of NOx in the exhaust gas reacts with the ozone to rapidly generate $NO_2$ having high reactivity, and if this $NO_2$ having high reactivity flows into the selective reduction catalyst together with the urea-based fluid supplied from the urea-based fluid injection nozzle into the exhaust pipe, even at a low exhaust gas temperature, $NO_2$ having high reactivity and the urea-based fluid cause a selective reduction reaction to proceed with the aid of the selective reduction catalyst. As a result, even if the exhaust gas temperature is low, NOx can be efficiently decreased. On the other hand, if the exhaust gas temperature becomes a predetermined temperature or higher, the oxidation catalyst oxidizes NO in the exhaust gas to $NO_2$ having high reactivity. Therefore, if this $NO_2$ having high reactivity flows into the selective reduction catalyst together with the urea-based fluid supplied from the urea-based fluid injection nozzle into the exhaust pipe, even at a high exhaust gas temperature, $NO_2$ having high reactivity and the urea-based fluid cause the selective reduction reaction to proceed with the aid of the selective reduction catalyst. As a result, even if the exhaust gas temperature becomes high, NOx can be efficiently decreased. In consequence, NOx can be efficiently decreased over almost all exhaust gas temperature range.

In the exhaust gas purifier of the second aspect of the present invention, the part of oxygen in the oxygen-rich gas separated by the air separator is introduced into the ozone generator and converted into ozone by the ozone generator, and the moisture within the dryer is removed by the nitrogen-rich gas separated by the air separator to regenerate the dryer. Therefore, the dryer can be efficiently regenerated. That is, since the air compressed by the compressor may not be used directly for the purpose of regenerating the dryer, the consumption amount of the air compressed by the compressor can be suppressed. As a result, since the ejection capacity of the compressor can be decreased, it is possible to achieve downsizing of the compressor. Also, if the oxygen-rich gas increases, the amount of moisture in the air to be removed by the dryer increases. However, the nitrogen-rich gas to be separated by the air separator increases as well. Therefore, the increased moisture within the dryer can be removed by this increased nitrogen-rich gas. As a result, even if the oxygen-rich gas increases or decreases, the nitrogen-rich gas also increases or decreases following the increase or decrease of the oxygen-rich gas. Therefore, the dryer can be efficiently regenerated. Furthermore, the ozone generator is cooled by using either one or both of the nitrogen-rich gas separated by the air separator and the drain water that is the moisture discharged from the dryer. Therefore, the ozone generator can be efficiently cooled.

In the exhaust gas purifier of the third aspect of the present invention, the porous moisture absorbing member that can absorb the drain water is provided on the surface of the ozone generator. Therefore, if the drain water is dropped onto the surface of the moisture absorbing member, this drain water soaks into the porous moisture absorbing member and spreads over a relatively wide area, and the ozone generator is cooled with a latent heat when this drain water vaporizes. As a result, when the nitrogen-rich gas is injected onto the surface of the moisture absorbing member in a state where the drain water soaks into the porous moisture absorbing member, the drain water rapidly vaporizes, and therefore, the ozone generator can be more efficiently cooled by this latent heat of vaporization.

In the exhaust gas purifier of the fourth aspect of the present invention, the air separator is configured by the oxygen enrichment membrane, the oxygen-rich gas is generated by passing of the air, which is dried by the dryer, through the oxygen enrichment membrane, and the nitrogen-rich gas is generated by going straight of the air, which is dried by the dryer, without passing through the oxygen enrichment membrane. Therefore, the oxygen-rich gas and the nitrogen-rich gas can be surely separated from each other by the oxygen enrichment membrane. As a result, by using the air separator having a relatively simple structure, the oxygen-rich gas and the nitrogen-rich gas can be efficiently generated by the oxygen enrichment membrane of this air separator.

In the exhaust gas purifier of the fifth aspect of the present invention, the gas flow rate regulation valve is provided in the purge pipe, which supplies the nitrogen-rich gas separated by the air separator into the dryer. Therefore, by merely adjusting the flow rate of the nitrogen-rich gas passing through the purge pipe in a state where the compressor is kept at a rated operation, the flow rate of the oxygen-rich gas can be adjusted as well. Also, the branch pipe, one end of which is connected to the purge pipe on the nitrogen-rich gas downstream side of the gas flow rate regulation valve, is provided so that the other end thereof faces the surface of the ozone generator. Therefore, the nitrogen-rich gas separated by the air separator can be efficiently distributed into the dryer and the ozone generator.

DESCRIPTION OF EMBODIMENTS

Next, embodiments of the invention will be described based on the accompanying drawings.

First Embodiment

As shown in FIG. 1, an exhaust gas purifier for a diesel engine 11 is configured so that an oxidation catalyst 13, an ozone injection nozzle 14, a urea-based fluid injection nozzle 16, and a selective reduction catalyst 17 are arranged in an exhaust pipe 12 of the engine 11 in this order towards an outlet of this exhaust pipe 12. An air intake pipe 19 is connected to an air intake port of this engine 11 via an air intake manifold 18, and the exhaust pipe 12 is connected to an exhaust port of this engine 11 via an exhaust manifold 21. The air intake pipe 19 is provided with a compressor housing 22a of a turbo supercharger 22 and an inter cooler 20 for cooling the intake air compressed by the turbo supercharger 22, and the exhaust pipe 12 is provided with a turbine housing 22b of the turbo supercharger 22. A compressor blade (not shown) is housed in the compressor housing 22a so as to be rotatable, and a turbine blade (not shown) is housed in the turbine housing 22b so as to be rotatable. The compressor blade and the turbine blade are connected with each other by a shaft (not shown), energy of an exhaust gas discharged from the engine 11 rotates via the shaft the turbine blade and the compressor blade via the shaft, and the intake air within the air intake pipe is compressed by means of rotation of this compressor blade.

The above-described selective reduction catalyst 17 is housed in a casing 23 having a larger diameter than the exhaust pipe 12. The selective reduction catalyst 17 is a monolith catalyst and is configured by coating a cordierite honeycomb carrier with zeolite or zirconia. Examples of the zeolite include copper zeolite, iron zeolite, zinc zeolite, cobalt zeolite, and the like. The selective reduction catalyst 17 made of copper zeolite is configured by coating a honeycomb carrier with a slurry containing zeolite powder having been ion-exchanged with copper. Also, the selective reduction catalyst 17 made of iron zeolite, zinc zeolite, or cobalt zeolite is configured by coating a honeycomb carrier with a slurry containing zeolite powder having been ion-exchanged with iron, zinc, or cobalt, respectively. Furthermore, the selective reduction catalyst 17 made of zirconia is configured by coating a honeycomb carrier with a slurry containing γ-alumina powder or θ-alumina powder having zirconia supported thereon.

Meanwhile, the urea-based fluid injection nozzle 16 is provided in the exhaust pipe 12 on the exhaust gas upstream side of the selective reduction catalyst 17. This urea-based fluid injection nozzle 16 is connected to a urea-based fluid supply device 26 for supplying urea-based fluid 24 to this nozzle 16. The urea-based fluid supply device 26 has a fluid supply pipe 27, a tip end of which is connected to the urea-based fluid injection nozzle 16; a fluid tank 28 that is connected to a base end of this fluid supply pipe 27 and that stores the urea-based fluid 24; a fluid pump 29 for forcedly supplying the urea-based fluid 24 within this fluid tank 28 into the urea-based fluid injection nozzle 16; and a fluid supply amount regulation valve 31 for regulating a supply amount (injection amount) of the urea-based fluid 24 which is injected from the urea-based fluid injection nozzle 16. The above-described urea-based fluid 24 is any one of ammonia gas, urea water, or mist-like urea, which functions as a reducing agent in the selective reduction catalyst 17, or a mixture of two or more of them. Also, the above-described fluid pump 29 is provided in the fluid supply pipe 27 between the urea-based fluid injection nozzle 16 and the fluid tank 28, and the fluid supply amount regulation valve 31 is provided in the fluid supply pipe 27 between the urea-based fluid injection nozzle 16 and the fluid pump 29. Furthermore, the fluid supply amount regulation valve 31 includes a fluid pressure regulation valve 32 that regulates a supply pressure of the urea-based fluid 24 into the urea-based fluid injection nozzle 16 and that is provided in the fluid supply pipe 27 and a fluid on-off valve 33 that opens and closes a base end of the urea-based fluid injection nozzle 16 and that is provided on the base end of the urea-based fluid injection nozzle 16.

The fluid pressure regulation valve 32 has first to third ports 32a to 32c; the first port 32a is connected to an ejection port of the fluid pump 29; the second port 32b is connected to the fluid on-off valve 33; and the third port 32c is connected to the fluid tank 28 via a return pipe 34. The urea-based fluid 24, which is forcedly supplied from the fluid pump 29, flows from the first port 32a into the fluid pressure regulation valve 32 and is forcedly supplied from the second port 32b into the fluid on-off valve 33. Also, if a pressure at the fluid pressure regulation valve 32 reaches a predetermined pressure or more, the urea-based fluid 24 which is forcedly supplied by the fluid pump 29 flows from the first port 32a into the fluid pressure regulation valve 32 and then goes through the return pipe 34 from the third port 32c and is returned to the fluid tank 28.

Meanwhile, the ozone injection nozzle 14 is provided in the exhaust pipe 12 on the exhaust gas upstream side of the urea-based fluid injection nozzle 16 (FIG. 1). This ozone injection nozzle 14 is connected to an ozone generation device 36 that generates ozone and that supplies the generated ozone to the ozone injection nozzle 14. This ozone generation device 36 is used to generate ozone which oxidizes NO in the exhaust gas discharged from the diesel engine 11 into $NO_2$. The above-described ozone generation device 36 includes a compressor 37 that compresses air, a dryer 38 that dries the air compressed by this compressor 37, and an ozone generator 39 that converts the air dried by this dryer 38 into ozone (FIGS. 1 and 2). In this embodiment, the above-described compressor 37 is configured so as to be driven by a battery having a direct current voltage of 24 V. While the compressor is driven by the battery having the direct current voltage of 24 V in this embodiment, the compressor may be driven by a crankshaft of the engine or it may be driven by a battery having a direct current voltage of in a range of from 200 to 300 V so long as a hybrid vehicle is concerned.

The above-described dryer 38 is configured so that a water vapor separation membrane 38a (FIG. 4) which water vapor (moisture) easily permeates through and which air hardly permeates through is housed in a cylindrical housing 38d. This water vapor separation membrane 38a is, for example, formed by bundling aromatic polyimide asymmetric hollow fibers 38b having 100 μm in membrane thickness, 500 μm in outer diameter, and 450 mm in length. The water vapor separation membrane 38a extends in the longitudinal direction of the housing 38d and housed in the housing 38d (FIG. 2). The above-described hollow fibers 38b are formed with through-holes 38c in the center thereof and have an asymmetric sparse-dense structure in the membrane thickness direction. The above-described through-hole 38c is, for example, formed so as have 300 μm in inner diameter. Also, an air inlet 38e that introduces the air compressed by the compressor 37 is formed on one end surface, in the longitudinal direction, of the housing 38d. An air outlet 38f that discharges the air dried by the dryer 38 is formed on the other end surface, in the longitudinal direction, of the housing 38d. The air inlet 38e is connected to one end of each hollow fiber 38b of the water vapor separation membrane 38a, and the air outlet 38f is connected to the other end of each hollow fiber 38b of the water vapor separation membrane 38a, whereby the air inlet 38e and the air outlet 38f are communicated with and connected to the through-hole 38c of each hollow fiber 38b.

Furthermore, a purge gas inlet 38g that introduces a nitrogen-rich gas which will described later as a purge gas and a purge gas outlet 38h that discharges the nitrogen-rich gas as the purge gas together with a water vapor (moisture) are formed on an outer peripheral surface of the housing 38d. Then, the nitrogen-rich gas introduced from the purge gas inlet 38g passes through outer peripheral surfaces of the hollow fibers 38b of the water vapor separation membrane 38a and is discharged from the purge gas outlet 38h.

Figure 4:
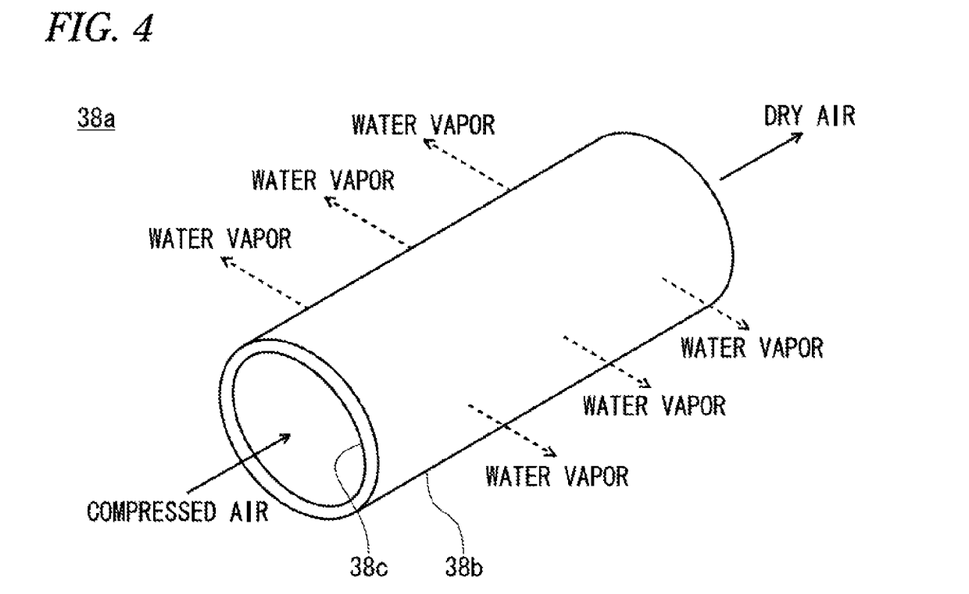
FIG. 4 is a main portion enlarged section view of a hollow fiber constituting a water vapor separation membrane of a dryer.

Here, when the air containing a water vapor (moisture) flows within the through-hole 38c of each hollow fiber 38b of the water vapor separation membrane 38a, the water vapor in the air flowing through the through-hole 38c permeates from an inner surface side of the membrane of the hollow fiber 38b with a higher water vapor partial pressure into an outer surface side of the membrane of the hollow fiber 38b with a lower water vapor partial pressure while utilizing a difference in water vapor partial pressure between on the inner surface side and the outer surface side of the membrane of the hollow fiber 38b as a driving force. Therefore, the water vapor in the air flowing through the through-hole 38c of the hollow fiber 38b decreases, and the dry air is discharged from the air outlet 38f.

In this embodiment, a silent discharge type ozone generator is used as the ozone generator 39 (FIG. 2). As shown in FIG. 3 in detail, this ozone generator 39 has a discharge electrode 39a and a ground electrode 39b which are arranged in parallel to each other while being separated with a predetermined interval; a dielectric 39c made of a ceramic such as $Al_2O_3$, etc., which is interposed between these electrodes 39a, 39b; a plate-like ceramic cover 39d that covers a surface of the ground electrode 39b; and a moisture absorbing member 39e provided on a surface of this ceramic cover 39d. A high-frequency high voltage is applied between the above-described pair of the electrodes 39a and 39b by a high-voltage power source apparatus (not shown), a plasma discharge is generated between the discharge electrode 39a and the dielectric 39c, and a part of oxygen contained in the air is converted into ozone by means of this plasma discharge. Also, the ceramic cover 39d is formed of aluminum nitride or silicon carbide with good heat conductivity, or the like. Furthermore, the moisture absorbing member 39e is formed of a ceramic such as porous zeolite capable of absorbing drain water 48 which will be described later, or the like. This moisture absorbing member 39e is formed in a porous state by coating the surface of the ceramic cover with a slurry containing zeolite powder or the like, followed by baking.

Meanwhile, an air separator 40 is provided between the dryer 38 and the ozone generator 39 (FIG. 2). This air separator 40 is configured so that an oxygen enrichment membrane 40a (FIG. 5) having such properties that an oxygen gas more easily permeates through it than a nitrogen gas in the air is housed in a cylindrical housing 40d. The oxygen enrichment membrane 40a is configured so as to separate the air dried by the dryer 38 into an oxygen-rich gas having a high oxygen concentration and a nitrogen-rich gas having a high nitrogen concentration. Specifically, the oxygen enrichment membrane 40a is formed by bundling hollow fibers 40b, each of which is made of a polymer that selectively allows an oxygen gas to more permeates therethrough than a nitrogen gas, is formed with a through-hole 40c in the center thereof, extends in a longitudinal direction of the housing 40d, and is housed in the housing 40d. Also, the hollow fibers 40b constituting the oxygen enrichment membrane 40a are preferably formed of a glassy polymer having a large degree of separation between an oxygen gas and a nitrogen gas, and more preferably formed of a polyimide having an especially large degree of separation between an oxygen gas and a nitrogen gas and having excellent mechanical strength, heat resistance, and durability, and the like. Also, the membrane of the hollow fiber 40b constituting the oxygen enrichment membrane 40a may be a homogenous membrane having a uniform density in the membrane thickness direction, or a composite membrane that is formed so that its density in the membrane thickness direction is non-uniform by inserting plural hollow fibers having different inner diameters, outer diameters, and densities may also be used. However, it is preferable to use an asymmetric membrane having a large permeation rate by having an asymmetric sparse-dense structure in the membrane thickness direction. Furthermore, it is preferable to set the membrane thickness of the hollow fiber 40b in a range of from 10 μm to 500 μm and to set the outer diameter of the hollow fiber 40b in a range of from 50 μm to 2000 μm.

A dry air inlet 40e that introduces the air dried by the dryer 38 is formed on one end surface of the housing 40d, which houses the oxygen enrichment membrane 40a. A nitrogen-rich gas outlet 40f that discharges the nitrogen-rich gas separated by the air separator 40 is formed on the other end surface of the housing 40d (FIG. 2). The dry air inlet 40e is connected to one end of each hollow fiber 40b of the oxygen enrichment membrane 40a, and the nitrogen-rich gas outlet 40f is connected to the other end of each hollow fiber 40b of the oxygen enrichment membrane 40a, whereby the dry air inlet 40e and the nitrogen-rich gas outlet 40f are communicated with and connected to the through-hole 40c of each hollow fiber 40b. Also, an oxygen-rich gas outlet 40g that discharges the oxygen-rich gas is formed on the outer peripheral surface of the housing 40d, which houses the oxygen enrichment membrane 40a. The oxygen-rich gas whose oxygen concentration has become high upon passing through the membrane of the hollow fibers 40b of the oxygen enrichment membrane 40a is discharged from the oxygen-rich gas outlet 40g.

Here, a principle of separating the dried air into the oxygen-rich gas having the high oxygen concentration and the nitrogen-rich gas having the high nitrogen concentration by the oxygen enrichment membrane 40a will be described. When the dried air flows through the through-hole 40c of each hollow fiber 40b of the oxygen enrichment membrane 40a, the membrane of the hollow fibers 40b causes thermal vibration to form gaps through which the gas passes, and therefore, oxygen molecules and nitrogen molecules in the air are captured into the above-described gaps. At that time, the thickness of the oxygen enrichment membrane 40a is formed relatively thin, and the rate of the oxygen molecules to permeate through the membrane of the hollow fibers 40b is about 2.5 times as larger as the rate of the nitrogen molecules to permeate through the membrane of the hollow fibers 40b. Therefore, the oxygen molecules rapidly permeate from the inner surface side of the membrane of the hollow fibers 40b having the high partial pressure into the outer surface side of the membrane of the hollow fibers 40b having the low partial pressure. Thereby, the oxygen concentration on the outer surface side of the membrane of the hollow fibers 40b becomes high, whereas the oxygen concentration on the inner surface side of the membrane of the hollow fibers 40b becomes low. As a result, the oxygen-rich gas is generated by passage of the air through the oxygen enrichment membrane 40a, and the nitrogen-rich gas is generated by going straight of the air without passing through the oxygen enrichment membrane 40a. It is noted that the gaps formed in the membrane of the hollow fibers 40b by means of the above-described thermal vibration is about 5 nm.

Meanwhile, the ejection port of the compressor 37 is connected to the air inlet 38e of the dryer 38 by a first supply pipe 41, and the air outlet 38f of the dryer 38 is connected to the dry air inlet 40e of the air separator 40 by a second supply pipe 42 (FIG. 2). Also, the oxygen-rich gas outlet 40g of the air separator 40 is connected to the oxygen-rich gas inlet 39f of the ozone generator 39 by a third supply pipe 43, and one end of a fourth supply pipe 44 is connected to the ozone outlet 39g of the ozone generator 39. Furthermore, the nitrogen-rich gas outlet 40f of the air separator 40 is connected to the purge gas inlet 38g of the dryer 38 by a purge pipe 46, and one end of a drain pipe 47 is connected to the purge gas outlet 38h of the dryer 38. The other end of this drain pipe 47 is provided so as to face the surface of the ozone generator 39, namely, the surface of the moisture absorbing member 39e, and the drain water 48 which is the moisture discharged from the dryer 38 goes through the drain pipe 47 and is dropped onto the moisture absorbing member 39e (FIGS. 2 and 3).

Meanwhile, an air tank 49 that stores the air compressed by the compressor 37 is provided in the first supply pipe 41, and a gas flow rate regulation valve 51 that regulates the flow rate of the nitrogen-rich gas passing through the purge pipe 46 is provided in the purge pipe 46 (FIG. 2). The above-described air tank 49 is provided to supply a sufficient amount of air into the air separator 40 and to relieve a pressure change of air even if the flow rates of the oxygen-rich gas and the nitrogen-rich gas are abruptly changed. Also, one end of a branch pipe 52 is connected to the purge pipe 46 on the nitrogen-rich gas downstream side of the gas flow rate regulation valve 51, and the other end of this branch pipe 52 is provided so as to face the surface of the ozone generator 39, namely, the surface of the moisture absorbing member 39e (FIGS. 2 and 3). A part of the nitrogen-rich gas separated by the air separator 40 goes through the purge pipe 46 and is supplied from the purge gas inlet 38g into the dryer 38, and the remainder (most) of the nitrogen-rich gas separated by the air separator 40 goes through the purge pipe 46 and the branch pipe 52 and is injected onto the surface of the moisture absorbing member 39e. A flow rate ratio of the nitrogen-rich gas which is supplied into the dryer 38 to the nitrogen-rich gas which is injected onto the surface of the moisture absorbing member 39e is set to be about 1:9. Here, the nitrogen-rich gas which is supplied from the purge gas inlet 38g into the dryer 38 is used merely to push out the moisture (drain water) within the dryer 38, and therefore, a small amount, to the extent of 10% of the all nitrogen-rich gas, is enough for such use. Also, examples of a method of setting the flow rate ratio of the nitrogen-rich gas which is supplied into the dryer 38 to the nitrogen-rich gas which is injected onto the surface of the moisture absorbing member 39e is set to be about 1:9 include a method of setting a inner diameter ratio between the purge pipe 46 and the branch pipe 52 on the nitrogen-rich gas downstream side of a connection part between the purge pipe 46 and the branch pipe 52 to be a predetermined ratio, a method of providing a throttle part in the purge pipe 46 on the nitrogen-rich gas downstream side of a connection part between the purge pipe 46 and the branch pipe 52; and the like. It is noted that in FIG. 2, a reference sign 53 indicates a check valve provided in the fourth supply pipe 44. This check valve 53 allows ozone to flow from the ozone generator 39 into the ozone injection nozzle 14 and inhibits ozone from flowing from the ozone injection nozzle 14 into the ozone generator 39. Also, in FIG. 3, a reference sign 54 indicates a nitrogen-rich gas injected from the other end of the branch pipe 52.

Referring back to FIG. 1, a casing 56 is provided in the exhaust pipe 12 on the exhaust gas upstream side of the ozone injection nozzle 14, and the oxidation catalyst 13 and a particulate filter 57 are housed in this casing 56 in this order from the exhaust gas upstream side. The oxidation catalyst 13 is a monolith catalyst and is configured by coating a cordierite honeycomb carrier with a noble metal catalyst such as platinum zeolite, platinum alumina, platinum-palladium alumina, or the like. Specifically, the oxidation catalyst 13 made of platinum zeolite is configured by coating a honeycomb carrier with a slurry containing a zeolite powder having been ion-exchanged with platinum. Also, the oxidation catalyst 13 made of platinum alumina is configured by coating a honeycomb carrier with a slurry containing a γ-alumina powder or θ-alumina powder having platinum supported thereon. Furthermore, the oxidation catalyst 13 made of platinum-palladium alumina is configured by coating a honeycomb carrier with a slurry containing a γ-alumina powder or θ-alumina powder having platinum and palladium which are supported thereon. Although illustration is omitted, the particulate filter 57 has a polygonal shape in section which is partitioned by porous partition made of a ceramic such as a cordierite. This filter 57 is configured by alternately sealing inlet parts and outlet parts of through-holes, which are mutually adjoining and which are formed by the partitions in parallel to each other, with sealing members. In this filter 57, at the time when the exhaust gas of the engine 11 introduced from the inlet parts of the filter 57 passes through the porous partitions, particulates contained in this exhaust gas are trapped and discharged from the outlet parts.

The above-described exhaust gas purifier is further provided with an air flow sensor 58 that detects an air intake amount of the engine 11; a NOx sensor 59 that detects a NOx concentration in the exhaust pipe 12, which is provided in the exhaust pipe 12 on the upstream side of the ozone injection nozzle 14; a first temperature sensor 61 that detects an inlet temperature of the selective reduction catalyst 17; and a second temperature sensor 72 that detects an inlet temperature of the oxidation catalyst 13. The air flow sensor 58 is provided in an inlet of the air intake pipe 19, and the NOx sensor 59 is provided in the exhaust pipe 12 between the turbine housing 22b and the oxidation catalyst 13. Also, the first temperature sensor 61 is located on the exhaust gas upstream side of the selective reduction catalyst 17 and is provided in the casing 23, which houses the selective reduction catalyst 17, and the second temperature sensor 72 is located on the exhaust gas upstream side of the oxidation catalyst 13 and is provided in the casing 56, which houses the oxidation catalyst 13 and the particulate filter 57. Meanwhile, the above-described ozone generation device 36 further includes a flow rate sensor 62 that detects the flow rate of the air dried by the dryer 38; and an ozone concentration sensor 63 that is provided between the ozone generator 39 and the ozone injection nozzle 14 and that detects a concentration of ozone generated in the ozone generator 39. The flow rate sensor 62 is provided in the third supply pipe 43 between the air separator 40 and the ozone generator 39, and the ozone concentration sensor 63 is provided in the fourth supply pipe 44 between the ozone generator 39 and the check valve 53. It is noted that an ultraviolet type sensor having durability against high-concentration ozone is used for the ozone concentration sensor 63 rather than a semiconductor type sensor which does not have durability against high-concentration ozone yet. This ozone concentration sensor 63 of the ultraviolet type is a sensor that utilizes such properties that ozone absorbs a wavelength in the vicinity of 254 nm. Furthermore, a load of the engine 11, namely, a fuel injection quantity, is detected by a load sensor 64, and a revolution speed of the engine 11 is detected by a rotation sensor 66.

Figure 7:
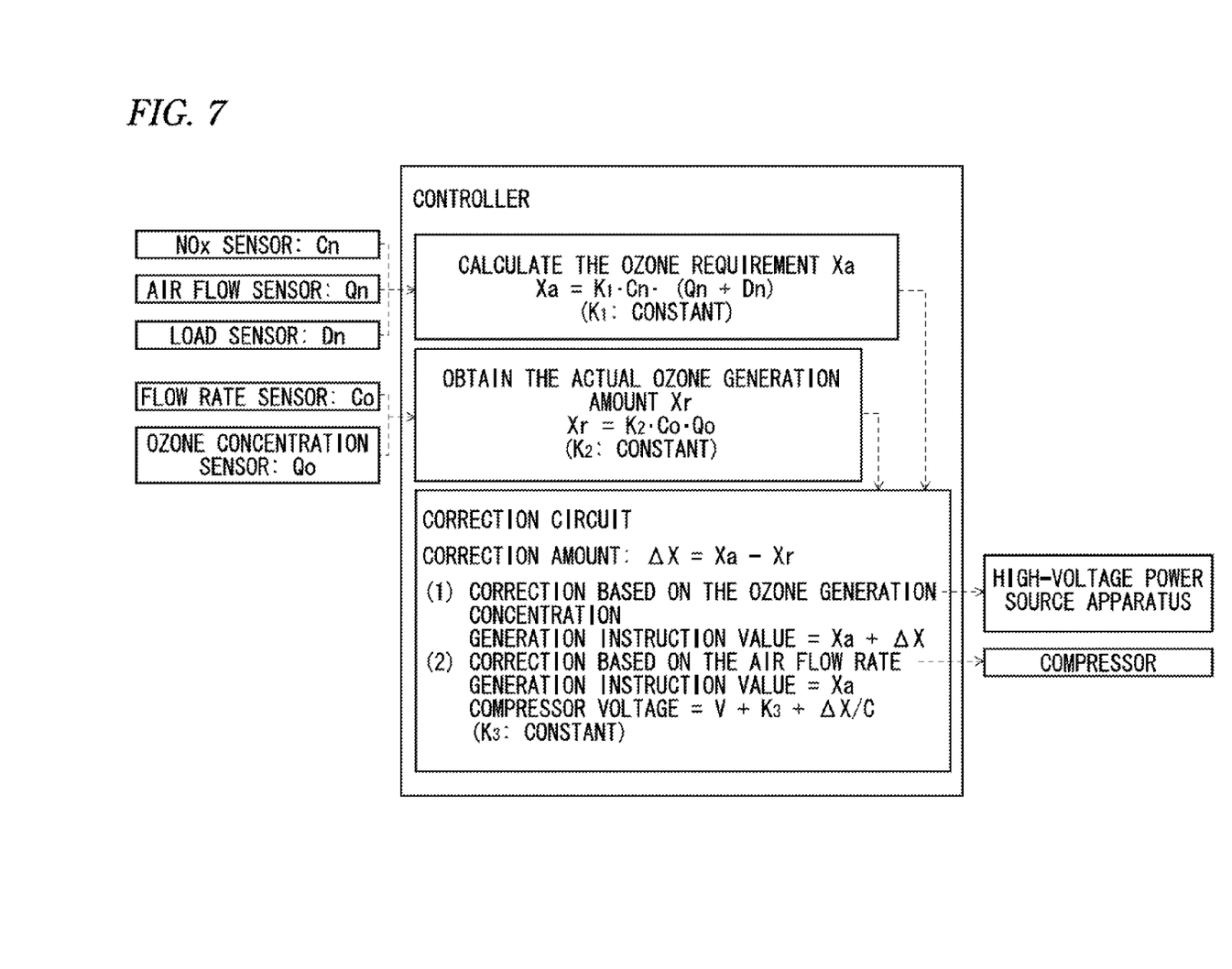
FIG. 7 is a flowchart for feeding back a difference between a computed value of an ozone requirement and an actual ozone generation amount, to thereby control the ozone generation amount.

Respective detection outputs of the above-described air flow sensor 58, NOx sensor 59, first temperature sensor 61, second temperature sensor 72, flow rate sensor 62, ozone concentration sensor 63, load sensor 64, and rotation sensor 66 are connected to a control input of a controller 67, and control outputs of the controller 67 is connected to the compressor 37, the ozone generator 39 (high-voltage power source apparatus), the fluid pump 29, the fluid on-off valve 33, and the gas flow rate regulation valve 51, respectively. A memory 68 is provided in the controller 67. As shown in FIG. 7 in detail, this memory 68a stores a computation equation ($Xa=K_1 \cdot Cn \cdot (Qn+Dn)$ ($K_1$: constant)) that computes an ozone requirement Xa (g/sec) based on a NOx concentration Cn (ppm) detected by the NOx sensor 59 and an exhaust gas flow rate computed from an air amount Qn (g/sec) detected by the air flow sensor 58 and a fuel injection quantity Dn (g/sec) into the engine 11, which is detected and output by the load sensor 64. Also, the memory 68 stores a computation equation ($Xr=K_2 \cdot Co \cdot Qo$ ($K_2$: constant)) that obtains an actual ozone generation amount Xr (g/sec) based on an air amount Co (g/sec) which flowing into the ozone generator 39 and which is detected by the flow rate sensor 62 and an ozone concentration Qo (ppm) detected by the ozone concentration sensor 63. Furthermore, the memory 68 stores, as a map, a change in flow rate ratio of NO to $NO_2$ in the exhaust gas with respect to a NOx concentration in the exhaust gas, an exhaust gas temperature at the inlet of the oxidation catalyst 13, and the exhaust gas flow rate which is computed from the air amount Qn detected by the air flow sensor 58 and the engine load (fuel injection quantity Dn into the engine 11) detected by the load sensor 64.

Figure 6:
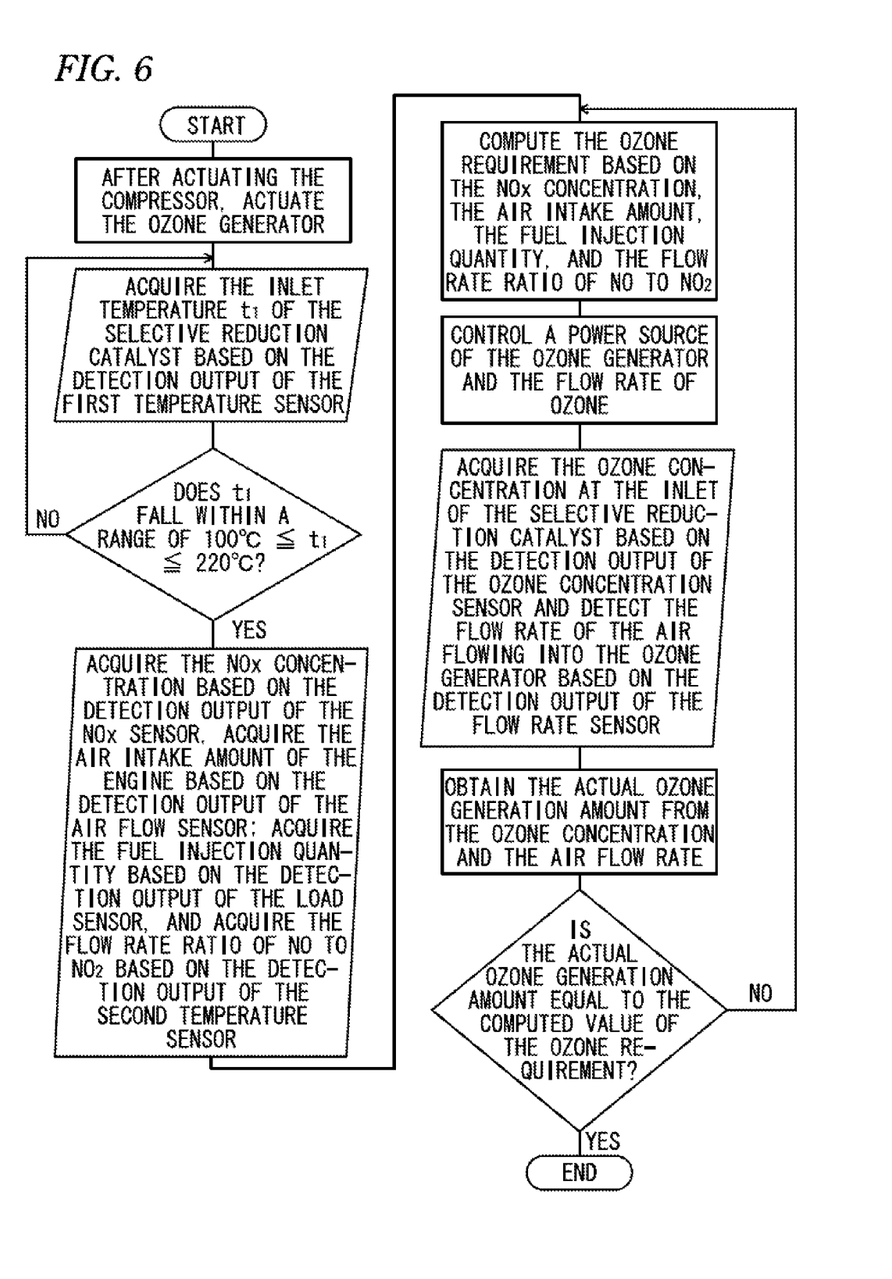
FIG. 6 is a flowchart showing a method of controlling a generation amount of ozone.

The operation of the thus configured exhaust gas purifier will be described based on flowcharts of FIGS. 6 and 7. Immediately after the engine 11 starts or at a time when the engine 11 operates under light load, the exhaust gas temperature at the inlet of the selective reduction catalyst 17 is lower than 220° C. When the first temperature sensor 61 detects the exhaust temperature in this temperature range, the controller 67 computes the ozone requirement Xa according to the computation equation ($Xa=K_1 \cdot Cn \cdot (Qn+Dn)$) based on the NOx concentration Cn detected by the NOx sensor 59, the air amount Qn detected by the air flow sensor 58, and the fuel injection quantity Dn into the engine, which is detected and output by the load sensor 64. Also, the controller 67 determines the actual ozone generation amount Xr according to the computation equation ($Xr=K_2 \cdot Co \cdot Qo$) based on the air amount Co detected by the flow rate sensor 62 and flowing into the ozone generator 39, and the ozone concentration Qo detected by the ozone concentration sensor 63. Then, the controller 67 controls the compressor 37 and the ozone generator 39 (high-voltage power source apparatus) so as to coincide with the above-described ozone requirement, to thereby regulate the air amount by the compressor 37 and also to regulate the ozone generation amount by the ozone generator 39 so as to generate an optimum amount of ozone. Furthermore, the controller 67 drives the fluid pump 29 and opens and closes the fluid on-off valve 33.

The ozone generated in the above-described ozone generator 39 is supplied into the ozone injection nozzle 14 and injected (supplied) from the ozone injection nozzle 14 into the exhaust pipe 12. Here, the reason why the ozone is supplied into the exhaust pipe 12 is to convert, by ozone, a part of NO in the exhaust gas into $NO_2$ having high reactivity, to thereby make the flow rate ratio of NO to $NO_2$ in the exhaust gas, which is introduced into the selective reduction catalyst 17, be close to a ratio of 1:1 at which a reduction reaction of NO and $NO_2$ to $N_2$ by the urea-based fluid 24 in the selective reduction catalyst 17 proceeds most rapidly. For that reason, the controller 67 determines the flow rate ratio of NO to $NO_2$ in the exhaust gas discharged from the engine 11 based on the NOx concentration in the exhaust gas, which is detected by the NOx sensor 59, the exhaust gas temperature at the inlet of the oxidation catalyst, which is detected by the second temperature sensor 72, and the exhaust gas flow rate which is computed from the air amount Qn detected by the air flow sensor 58 and the engine load (fuel injection quantity Dn into the engine 11) detected by the load sensor 64. Then, the controller 67 controls the compressor 37 and the ozone generator 39 (high-voltage power source apparatus) so that the flow rate ratio of NO to $NO_2$ to be introduced into the selective reduction catalyst 17 is close to 1:1, to thereby generate an appropriate amount of ozone. When this ozone is supplied into the exhaust pipe 12, a part of NO in the exhaust gas is rapidly converted into $NO_2$ by ozone ($O_3$) as expressed by the following formula (1).

$$O_3+NO \rightarrow O_2+NO_2 \qquad (1)$$

As a result, even if the surrounding environment (surrounding temperature and/or surrounding humidity) of the ozone generator 39 changes, ozone in proper quantity that corresponds to the NOx amount in the exhaust gas and the flow rate ratio of NO to $NO_2$ can be supplied into the exhaust pipe 12, namely an just enough ozone in accurate amount following the operation state of the engine 11 can be supplied into the exhaust pipe 12.

Meanwhile, when the fluid pump 29 is driven and when the fluid on-off valve 33 is opened and closed, the urea-based fluid 24 goes through the fluid supply pipe 27 and is intermittently injected (supplied) into the exhaust pipe 12. Here, the reason why the urea-based fluid 24 is supplied into the exhaust pipe 12 is for the urea-based fluid 24 to function as a reducing agent for reduction of NOx (NO and $NO_2$) in the exhaust gas to N2. When NO and $NO_2$, which are already contained in the exhaust gas discharged from the engine 11, $NO_2$ resulting from oxidation of a part of NO in this exhaust gas by ozone, and the urea-based fluid 24 are introduced into the selective reduction catalyst 17, even if the exhaust gas temperature at the inlet of the selective reducing catalyst 17, which is detected by the first temperature sensor 61, is lower than 220° C., $NO_2$ having high reactivity and the urea-based fluid 24 cause a selective reduction reaction to proceed with the aid of the selective reduction catalyst 17, and thereby $NO_2$ is reduced into N2. As a result, even if the above-described exhaust gas temperature is low, NOx can be efficiently decreased. It is noted that when the above-described exhaust gas temperature is lower than 220° C., the oxidation catalyst 13 is not activated, so that it does not exhibit the function to oxidize NO to $NO_2$.

A specific chemical reaction in the selective reduction catalyst 17 is expressed by the following formulae (2) and (3) in the case where the urea-based fluid 24 is urea water and also expressed by the following formula (4) in the case where the urea-based fluid 24 is an ammonia gas, respectively.

$$(NH_2)_2CO+H_2O \rightarrow 2NH_3+CO_2 \qquad (2)$$

$$NO+NO_2+2NH_3 \rightarrow 2N_2+3H_2O \qquad (3)$$

$$NO+NO_2+2NH_3 \rightarrow 2N_2+3H_2O \qquad (4)$$

The above-described formula (2) represents a chemical reaction formula in which hydrolysis of the urea water (urea-based fluid 24) to an ammonia gas proceeds although its amount is relatively small because the exhaust gas temperature at the inlet of the selective reduction catalyst 17 is relatively is lower than 220° C. and is relatively low. Also, the above-described formula (3) represents a chemical reaction formula in which NO and $NO_2$ in the exhaust gas react with the ammonia gas hydrolyzed from the above-described urea water with the aid of the selective reduction catalyst 17 and NO and $NO_2$ are reduced to $N_2$. Furthermore, the above-described formula (4) represents a chemical reaction formula in which NO and $NO_2$ in the exhaust gas react with the ammonia gas (urea-based fluid 24) with the aid of the selective reduction catalyst 17, and NO and $NO_2$ are reduced to $N_2$. Here, as compared with the use of urea water as the urea-based fluid 24, the use of the ammonia gas allows the reduction reaction of NO and $NO_2$ to $N_2$ to proceed more rapidly, and therefore, it is preferable to use the ammonia gas as the urea-based fluid 24.

Also, if the exhaust gas temperature at the inlet of the selective reduction catalyst 17 is 220° C. or higher, the controller 67 stops the compressor 37 and the ozone generator 39 (high-voltage power source apparatus) of the ozone generation device 36 and also closes the gas flow rate regulation valve 51 based on the detection output of the first temperature sensor 61. This is because if the above-described exhaust gas temperature becomes a relatively high temperature, the oxidation catalyst 13 is activated to exhibit a function to oxidize NO to $NO_2$, and therefore, the ozone generation device 36 becomes unnecessary. As a result, even if the exhaust gas temperature becomes high, NOx can be efficiently decreased. In consequence, NOx can be efficiently decreased over almost all exhaust gas temperature range.

Meanwhile, when the compressor 37 of the ozone generation device 36 is driven, the air is compressed and stored in the air tank 49. The dryer 38 removes the moisture of the air to thereby dray the air, and this dried air is separated, by the air separator 40, into an oxygen-rich gas having a high oxygen concentration and a nitrogen-rich gas having a high nitrogen concentration. The oxygen-rich gas separated by the sir separator 40 is supplied into the ozone generator 39, a part of oxygen in the oxygen-rich gas is converted into ozone by the ozone generator 39, and this ozone goes through the fourth supply pipe 44 and is supplied into the ozone injection nozzle 14.

A part of the nitrogen-rich gas 54 separated by the air separator 40 goes through the purge pipe 46 and is supplied from the purge gas inlet 38g into the dryer 38, and the remainder (most) of the nitrogen-rich gas 54 separated by the air separator 40 goes through the purge pipe 46 and the branch pipe 52 and is injected onto the surface of the moisture absorbing member 39e of the ozone generator 39. By supplying the part of the nitrogen-rich gas 54 into the dryer 38, the drain water 48 which is the moisture separated by the dryer 38 is pushed out, goes through the drain pipe 47, and is dropped onto the surface of the moisture absorbing member 39e of the ozone generator 39. At that time, the drain water 48 soaks into the porous moisture absorbing member 39e and spreads over a relatively wide area. When the nitrogen-rich gas 54 is sprayed onto the surface of the moisture absorption member 39e in this state, the drain water 48 rapidly vaporizes, and therefore, the ozone generator 39 is cooled by this latent heat of vaporization. In this way, since not only both the nitrogen-rich gas 54 separated by the air separator 40 and the drain water 48 discharged from the dryer 38 are used, but also the drain water 48 is caused to soak into the porous moisture absorbing member 39e to cool the ozone generator 39 which is easy to generate heat due to internal discharge, the ozone generator 39 can be efficiently cooled.

Meanwhile, since the dryer 38 is regenerated using the nitrogen-rich gas 54, which is unnecessary for generating ozone, without using an oxygen-rich gas which is necessary for generating ozone, the dryer 38 can be efficiently regenerated. Also, since the air compressed by the compressor 37 may not be used directly for the purpose of regenerating the dryer 38, the consumption amount of the air compressed by the compressor 37 can be suppressed. As a result, since the ejection capacity of the compressor 37 can be decreased, it is possible to contemplate to achieve downsizing of the compressor 37. Furthermore, if the oxygen-rich gas is increased, the moisture amount in the air which is to be removed by the dryer 38 also increases. However, in that case, since the opening degree of the gas flow rate regulation valve 51 is made large, the nitrogen-rich gas 54 which is separated by the air separator 40 also increases. Therefore, the increased moisture within the dryer 38 can be removed by this increased nitrogen-rich gas 54. As a result, even if the oxygen-rich gas increases or decreases, the nitrogen-rich gas 54 also increases or decreases in accordance with this increase or decrease of the oxygen-rich gas, and therefore, the dryer 38 can be efficiently regenerated. The increased moisture (drain water 48) within the above-described dryer 38 goes through the drain pipe 47, is dropped onto the surface of the moisture absorption member 39e of the ozone generator 39, and is used for cooling of the ozone generator 39.

Second Embodiment

Figure 8:
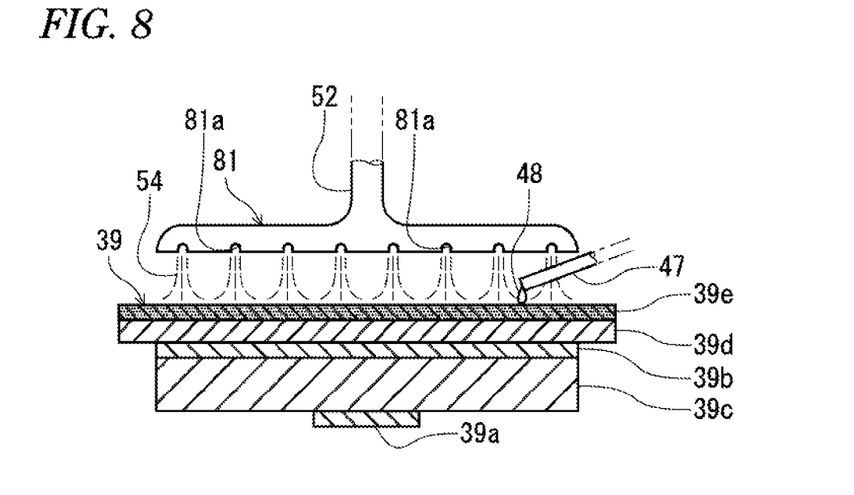
FIG. 8 is a main portion configuration diagram showing a second embodiment of the present invention and corresponding to FIG. 3.

FIG. 8 shows a second embodiment of the present invention. In FIG. 8, the same symbols as those in FIG. 3 represent the same components. In this embodiment, a nitrogen injection nozzle 81 is connected to a tip end of the branch pipe 52. The nitrogen injection nozzle 81 is provided so as to have a predetermined gap from the surface of the ozone generator 39, namely the surface of the moisture absorption member 39e and to extend in parallel to the surface of the moisture absorption member 39e. In this nitrogen injection nozzle 81, plural injection ports 81a facing the surface of the moisture absorption member 39e are formed in predetermined intervals in a longitudinal direction of the nitrogen injection nozzle 81. Also, the drain pipe 47 whose one end is connected to the purge gas outlet of the dryer has the other end which is inserted between the nitrogen injection nozzle 81 and the moisture absorption member 39e obliquely towards the moisture absorption member 39e. The second embodiment has the same configuration as the first embodiment except the above.

In the thus configured ozone generation apparition of the exhaust gas purifier, the nitrogen-rich gas 54 separated by the air separator goes through the purge pipe and the branch pipe 52 and is injected substantially uniformly from the plural injection ports 81a of the nitrogen injection nozzle 81 onto the surface of the moisture absorption member 39e of the ozone generator 39. Therefore, the ozone generator 39 can be cooled more efficiently as compared with the first embodiment. The operations other than those described above are substantially the same as the operations of the first embodiment, and therefore, redundant description thereon will be omitted.

It is noted that in the above-described first and second embodiments, the exhaust gas purifier of the present invention is applied to the diesel engine. However, the exhaust gas purifier of the present invention may also be applied to a gasoline engine. Also, in the above-described first and second embodiments, the exhaust gas purifier of the present invention is applied to the diesel engine having the turbo supercharger. However, the exhaust gas purifier of the present invention may also be applied to a natural aspirated diesel engine or a natural aspirated gasoline engine. Also, in the above-described first and second embodiments, the silent discharge type is used as the ozone generator. However, a creeping discharge type, a type of irradiate air with ultraviolet rays to generate ozone, a type of electrolyzing water to generate ozone, or the like may also be used as the ozone generator. Also, in the above-described first and second embodiments, the air tank is provided between the compressor and the dryer. However, in the case where the flow rates of the oxygen-rich gas and the nitrogen-rich gas do not abruptly change, the air tank may not be provided. Also, in the above-described first and second embodiments, the fluid pressure is regulated by the fluid pressure regulation valve, which is a three way valve. However, the fluid pressure may be regulated by adjusting an opening/closing time of the fluid on-off valve and the presence or absence of driving of the fluid pump without using the fluid pressure regulation valve. Also, in the above-described first and second embodiments, the air is supplied to the ozone generator. However, an air-containing exhaust gas of the engine may also be supplied. Furthermore, in the above-described first and second embodiments, the ceramic cover of the ozone generator is formed in a plate-like shape. However, plural fins may be provided on the surface of the plate-like ceramic cover in predetermined intervals to rise up from the surface of the plate-like ceramic cover. In that case, a cooling performance of the ozone generator is enhanced. It is noted that the moisture absorption member is formed in a porous state by baking after being coated on the surfaces of the ceramic cover and the fins.

INDUSTRIAL APPLICABILITY

The exhaust gas purifier of the present invention can be utilized for decreasing nitrogen oxides (NOx) contained in an exhaust gas of an engine by using ozone and a urea-based fluid, to thereby purify the exhaust gas.

It is noted that this international application claims the priority of Japanese Patent Application No. 2011-206122 filed on Sep. 21, 2011, and the contents of Patent Application No. 2011-206122 are incorporated herein by reference in its entirety.

The invention claimed is:
1. An exhaust gas purifier comprising:
an oxidation catalyst;
an ozone injection nozzle;
a urea-based fluid injection nozzle;
a selective reduction catalyst, wherein the oxidation catalyst, the ozone injection nozzle, the urea-based fluid injection nozzle, and the selective reduction catalyst are arranged in an exhaust pipe of an engine in this order towards an outlet of the exhaust pipe;
an air flow sensor that detects an air intake amount of the engine;
a NOx sensor that is provided in the exhaust pipe on an upstream side of the ozone injection nozzle and that detects a NOx concentration in the exhaust pipe;
a first temperature sensor that detects an inlet temperature of the selective reduction catalyst;
a second temperature sensor that detects an inlet temperature of the oxidation catalyst;
an ozone generation device to which the ozone injection nozzle is connected;
a load sensor that detects a load of the engine; and
a controller, wherein
the ozone generation device includes
a compressor that compresses air,
a dryer that dries the air compressed by the compressor,
a flow rate sensor that detects a flow rate of the air dried by the dryer,
an ozone generator that converts the air detected by the flow rate sensor into ozone, and
an ozone concentration sensor that is provided between the ozone generator and the ozone injection nozzle and that detects a concentration of the ozone converted by the ozone generator, and
the controller controls an amount of air compressed by the compressor and an amount of ozone converted by the ozone generator based on respective detection outputs of the air flow sensor, the NOx sensor, the first temperature sensor, the second temperature sensor, the flow rate sensor, the ozone concentration sensor, and the load sensor.

2. The exhaust gas purifier according to claim 1, wherein
the ozone generation device further includes an air separator that is provided between the dryer and the ozone generator and that separates the air dried by the dryer into an oxygen-rich gas having a high oxygen concentration and a nitrogen-rich gas having a high nitrogen concentration,
a part of oxygen in the oxygen-rich gas separated by the air separator is introduced into the ozone generator and converted into ozone by the ozone generator, and
moisture within the dryer is removed by the nitrogen-rich gas separated by the air separator, to regenerate the dryer, and
the ozone generator is cooled by either or both of the nitrogen-rich gas separated by the air separator and drain water that is the moisture discharged from the dryer.

3. The exhaust gas purifier according to claim 2, wherein a porous moisture absorption member that can absorb the drain water is provided on a surface of the ozone generator.

4. The exhaust gas purifier according to claim 2, wherein
the air separator includes an oxygen enrichment membrane,
the oxygen-rich gas is generated by passage of the air, which is dried by the dryer, through the oxygen enrichment membrane, and
the nitrogen-rich gas is generated by passing of the air through the air separator, which is dried by the dryer, without passing through the oxygen enrichment membrane.

5. The exhaust gas purifier according to claim 2, wherein
the nitrogen-rich gas separated by the air separator goes through a purge pipe and is supplied to the dryer,
a gas flow rate regulation valve that regulates a flow rate of the nitrogen-rich gas, which passes through the purge pipe, is provided in the purge pipe,
one end of a branch pipe is connected to the purge pipe on a nitrogen-rich gas downstream side of the gas flow rate regulation valve, and
the other end of the branch pipe is provided to face a surface of the ozone generator.

* * * * *